(12) United States Patent
Kamimura et al.

(10) Patent No.: US 9,802,563 B2
(45) Date of Patent: Oct. 31, 2017

(54) VEHICLE FRONT PORTION STRUCTURE PROVIDED WITH A PEDESTRIAN COLLISION DETECTION SENSOR

(71) Applicant: TOYOTA JIDOSHA KABUSHIKI KAISHA, Toyota-shi (JP)

(72) Inventors: Shinya Kamimura, Toyota (JP); Naoya Higashimachi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/382,180

(22) Filed: Dec. 16, 2016

(65) Prior Publication Data

US 2017/0225637 A1 Aug. 10, 2017

(30) Foreign Application Priority Data

Feb. 8, 2016 (JP) ................................ 2016-021957

(51) Int. Cl.
*B60R 19/48* (2006.01)
*B60R 19/18* (2006.01)
*B62D 21/15* (2006.01)
*B62D 29/00* (2006.01)
*B60R 21/34* (2011.01)
*B60R 99/00* (2009.01)

(52) U.S. Cl.
CPC ............. *B60R 19/48* (2013.01); *B60R 19/18* (2013.01); *B60R 21/34* (2013.01); *B62D 21/152* (2013.01); *B62D 29/008* (2013.01); *B60R 2021/343* (2013.01); *B60R 2099/005* (2013.01)

(58) Field of Classification Search
CPC ......... B60R 19/48; B60R 19/18; B60R 21/34; B60R 2021/343; B60R 2099/005; B62D 21/152; B62D 29/008

USPC ....... 296/187.04, 187.09, 1.04; 293/107, 117
See application file for complete search history.

(56) References Cited

U.S. PATENT DOCUMENTS

| 2016/0039376 | A1* | 2/2016 | Narita | B60R 19/483 |
| | | | | 293/4 |
| 2016/0101753 | A1* | 4/2016 | Higashimachi | B60R 19/023 |
| | | | | 293/117 |
| 2017/0043735 | A1* | 2/2017 | Yamaguchi | B60R 19/44 |

FOREIGN PATENT DOCUMENTS

| JP | 2015-74422 | | 4/2015 |
| JP | 2015131589 A | * | 7/2015 |
| WO | WO 2012/113362 A1 | | 8/2012 |

* cited by examiner

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A vehicle front portion structure including: a bumper reinforcement disposed at a vehicle front end portion side such that a longitudinal direction of the bumper reinforcement is aligned with a vehicle transverse direction; a pedestrian collision detection sensor comprising a pressure tube and outputting signals based on pressure changes in the pressure tribe, the pressure tube including: a main tube disposed at a vehicle front side of the bumper reinforcement d extending along the bumper reinforcement from one end portion in the longitudinal direction of the bumper reinforcement to another end portion in the longitudinal direction thereof; and a pair of outer side tubes provided continuously with the main tube and, as viewed from a vehicle front-rear direction, extending respectively towards a. vehicle lower side from positions of the one end portion and the other end portion of the main tube; and an absorber, is provided.

4 Claims, 5 Drawing Sheets

VEHICLE FRONT PORTION STRUCTURE PROVIDED WITH A PEDESTRIAN COLLISION DETECTION SENSOR

CROSS-REFERENCE TO RELATED APPLICATION

This application is based on and claims priority under 35 USC 119 from Japanese Patent Application No. 2016-021957 filed on Feb. 8, 2016, the disclosure of which is incorporated by reference herein.

BACKGROUND

Technical Field

The present invention relates to a vehicle front portion structure that is provided with a pedestrian collision detection sensor.

Related Art

Conventionally, in a pedestrian protection device such as a pop-up hood that operates in the event of a collision between a vehicle and a pedestrian, a pedestrian collision detection system (sensor) is employed that is capable of determining whether or not a collision object that has collided with the vehicle is a pedestrian. An example of this is disclosed in Japanese Patent Application Laid-Open (JP-A) No. 2015-074422. This pedestrian collision detection system is formed by a flexible tubular object and is provided with a pressure tube that, as viewed from the vehicle front-rear direction, is bent in a U-shape and is positioned such that the U protrudes outwards in the vehicle transverse direction. A portion on a vehicle upper side of this pressure tube is formed by an upper tube, and this upper tube is disposed at a front surface of a bumper reinforcement and is disposed along an upper absorber that extends in the vehicle transverse direction.

In contrast, a lower tube that forms a portion on a vehicle lower side of the pressure tube is disposed on a vehicle lower side of the bumper reinforcement and on a front surface of a front member, and is disposed along a lower absorber that extends in the vehicle transverse direction. A pressure sensor that detects pressure changes inside the pressure tube and outputs signals based on these pressure changes is provided at end portions of the lower tube. As a result, in the prior art described in Japanese Patent Application Laid-Open (JP-A) No. 2015-074422, during a collision between a vehicle and a collision object, it is possible to determine whether or not this collision object is a pedestrian based on changes in the signals output from the pressure sensor.

However, in the aforementioned prior art, if only the lower tube is pressed during a collision, namely, if the collision object is a small animal or the like, then an unnecessary determination is made. In other words, in the prior art described in the aforementioned Japanese Patent Application Laid-Open (JP-A) No. 2015-074422, when the collision object is a small animal or the like, there is room for improvement in the ability to suppress the effect imparted to the pressure tube by the collision object.

In consideration of the above-described circumstances, it is an object of the present invention to provide a vehicle out portion structure that is provided with a pedestrian collision detection sensor that is capable of suppressing the effect imparted to a pressure tube by a collision object when the collision object is a small animal or the like.

SUMMARY

According to a first aspect of the present invention, a vehicle front portion structure provided with a pedestrian collision detection sensor, the vehicle front portion structure comprising: a bumper reinforcement disposed at a vehicle front end portion side such that a longitudinal direction of the bumper reinforcement is aligned with a vehicle transverse direction; a pedestrian collision detection sensor comprising a pressure tube and outputting signals based on pressure changes in the pressure tube, the pressure tube comprising: a main tube disposed at a vehicle front side of the bumper reinforcement and extending along the bumper reinforcement from one end portion in the longitudinal direction of the bumper reinforcement to another end portion in the longitudinal direction thereof; and a pair of outer side tubes provided continuously with the main tube and, as viewed from a vehicle front-rear direction, extending respectively towards a vehicle lower side from positions of the one end portion and the other end portion of the main tube; and an absorber disposed at the vehicle front side of the bumper reinforcement such that a longitudinal direction of the absorber is aligned with the vehicle transverse direction, the absorber covering the bumper reinforcement and the pressure tube from the vehicle front side, and comprising a holding groove portion holding the main tube and portions of the outer side tubes at a vehicle upper side, and, in the absorber, a predetermined range overlapping with portions of the outer side tubes at the vehicle lower side as viewed from the vehicle front-rear direction is separated in the vehicle front-rear direction from the portions of the outer side tubes at the vehicle lower side.

According to a first aspect of the present invention, a pressure tube which forms part of a pedestrian collision detection sensor is disposed at a vehicle front side of a bumper reinforcement that is disposed at a vehicle front end portion side such that the longitudinal direction of the bumper reinforcement is aligned with the vehicle transverse direction. This pressure tube is provided with a main tube and a pair of outer side tubes. The main tube is disposed along the bumper reinforcement, and extends from one end portion in the longitudinal direction of the bumper reinforcement to another end portion in the longitudinal direction thereof. In addition, the outer side tubes are provided continuously with the main tube and, as viewed from the vehicle front-rear direction, extend respectively towards a vehicle lower side from the positions on the main tube of the one end portion in the longitudinal direction of the bumper reinforcement and the other end portion in this longitudinal direction. Moreover, an absorber is disposed at a vehicle front side of the bumper reinforcement such that the longitudinal direction of the absorber is aligned with the vehicle transverse direction, and the vehicle front side of the bumper reinforcement and the pressure tube are covered by this absorber. A holding groove portion is provided in the absorber, and portions on the vehicle upper side of the main tube and the outer side tubes are held by this holding groove portion.

Because of this, during a collision between a collision object such as a pedestrian or the like and a vehicle, if the collision load from this collision object is input into the absorber, the main tube or a portion on the vehicle upper side of the outer side tube are pressed by the absorber. The vehicle rear sides of the main tube and the portion on the vehicle upper side of the outer side tube are supported by the bumper reinforcement. As a result, the pressure tube receives reaction force from the bumper reinforcement and is deformed. A signal is then output from the pedestrian collision detection sensor based on the pressure change in the pressure tube.

A possibility may also be considered in which, if a collision object such as a small animal collides with a vehicle, then a portion on the vehicle lower side of the absorber may be pressed by the collision object.

Here, in the present invention, a predetermined range of the absorber that overlaps with the portion on the vehicle lower side of the outer side tube as viewed from the vehicle front-rear direction is separated in the vehicle front-rear direction from this portion on the vehicle lower side of the outer side tube. Because of this, between the predetermined range of the absorber and the portion on the vehicle lower side of the outer side tube, the free running distance from the predetermined range of the absorber to the portion on the vehicle lower side of the outer side tube is secured. As a result, even if a collision object such as a small animal or the like collides with the vehicle, any pressing of the portion on the vehicle lower side of the outer side tube by the absorber is suppressed.

According to a second aspect of the present invention, the vehicle front portion structure provided with a pedestrian collision detection sensor further comprising a recessed portion recessed towards the vehicle front side and formed within the predetermined range.

According to a second aspect of the present invention, a recessed portion that is recessed towards the vehicle front side is formed within the predetermined range of the absorber that, as viewed from the vehicle front-rear direction, overlaps with the portion on the vehicle lower side of the outer side tube. Because of this, even if a collision object such as a small animal collides with the vehicle and causes the absorber to be displaced towards the vehicle rear side, the portion on the vehicle lower side of the outer side tube is contained within the recessed portion, and any contact between the portion on the vehicle lower side of the outer side tube and the absorber is suppressed.

According to a third aspect of the present invention, the vehicle front portion structure provided with a pedestrian collision detection sensor further comprising anchoring portions formed at a plurality of locations at peripheral edge portions of the holding groove portion, the anchoring portions restricting any displacement of the pressure tube in the vehicle front-rear direction, and the pressure tube being constructed from an elastically deformable resin material.

According to a third aspect of the present invention, the pressure tube is constructed from an elastically deformable resin material, and the pressure tube can be easily disposed in the holding groove portion of the absorber.

However, because it is difficult to prevent the pressure tube from expanding or contracting when this is caused by changes in the peripheral temperature surrounding the pressure tube, the possibility that the length of the pressure tube will change due to such changes in the peripheral temperature surrounding the pressure tube must be considered. Here, in the present invention, because any displacement of the main tube of the pressure tube and of the portions on the vehicle upper side of the outer side tubes of the pressure tube in any direction other than the longitudinal direction thereof is suppressed by the holding groove portion and the anchoring portions, any change in the length of the pressure tube is concentrated in the portion on the vehicle lower side of the outer side tubes. Moreover, in the present invention, the predetermined range of the absorber that overlaps with the portion on the vehicle lower side of the outer side tubes as viewed from the vehicle front-rear direction is separated in the vehicle front-rear direction from this portion on the vehicle lower side of the outer side tubes. Because of this, the amount of change in the length of the pressure tube that is caused by changes in the peripheral temperature and the like surrounding the pressure tube can be absorbed by the space between the absorber and the portion on the vehicle lower side of the outer side tubes.

As has been described above, the vehicle front portion structure that is provided with a pedestrian collision detection sensor according to the first aspect of the present invention has the excellent effect that it is capable of suppressing the effect imparted to a pressure tube by a collision object when the collision object is a small animal or the like.

The vehicle front portion structure that is provided with a pedestrian collision detection sensor according to the second aspect of the present invention has the excellent effect, in addition to the above-described effect, that it is possible to secure a degree of design freedom in a bumper cover that is disposed at a vehicle front side of an absorber.

The vehicle front portion structure that is provided with a pedestrian collision detection sensor according to the third aspect of the present invention has the excellent effect that it is possible to suppress both the effect imparted to a pressure tube by a collision object such as a small animal or the like, and the effect imparted to the pressure tube by the peripheral temperature surrounding the pressure tube.

BRIEF DESCRIPTION OF THE DRAWINGS

Exemplary embodiments of the present invention will be described in detail based on the following figures, wherein.

DETAILED DESCRIPTION

Figure 1:
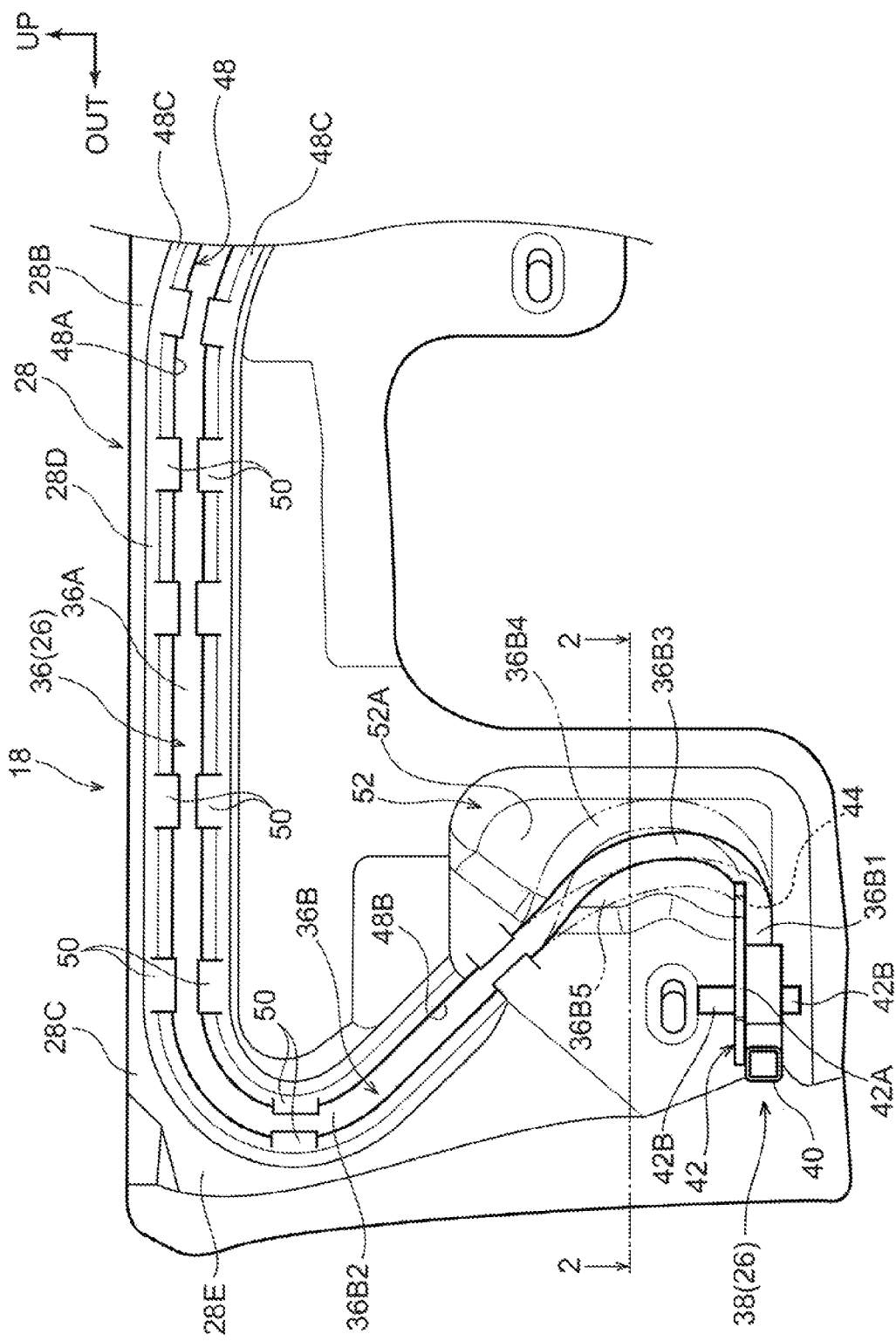
FIG. 1 is an enlarged front view as seen from a vehicle rear side showing principal portions (i.e., an enlarged view of portions surrounded by the double dot chain line in FIG. 3) of a vehicle front portion structure that is provided with a pedestrian collision detection sensor according to the present exemplary embodiments.

Hereinafter, an example of a vehicle front portion structure that is provided with a pedestrian collision detection sensor according to the present exemplary embodiments will be described using FIG. 1 through FIG. 5. Note that an arrow FR, an arrow UP, and an arrow OUT that are shown where appropriate in the drawings respectively indicate a vehicle body front side, a vehicle body upper side, and an outer side in a vehicle body transverse direction.

Firstly, the schematic structure of a [vehicle front portion 12] that forms part in a vehicle front side of a [vehicle 10] to which a vehicle front portion variable structure according to the present exemplary embodiment has been applied will be described using FIG. 5. Note that, in the present exemplary embodiment, because the vehicle 10 fundamentally has a left-right symmetrical structure, the following description concentrates on the structure of a portion on the left side on the vehicle transverse direction of the vehicle front portion 12.

The vehicle front portion 12 is constructed so as to include a pair of left and right front side members (not shown in the drawings), crash boxes 16 that are attached to the front side members, and a front bumper 18.

The front side members form the framework of a vehicle body 14, and overall they extend in the vehicle front-rear direction, and are formed as closed cross-sectional structures that have a rectangular frame-shaped closed cross-section as viewed from the vehicle front-rear direction. The front side members are constructed so as to include a front portion that forms the portion on the vehicle front side thereof and extends linearly in the vehicle front-rear direction, and a kick portion (not shown in the drawings) that is provided continuously with the aforementioned front portion and is provided such that it slopes downwards and towards the vehicle rear.

The crash boxes 16 include an impact absorption portion 16A that is formed in a cylindrical shape, and a plate-shaped mourning portion (not shown in the drawings) that extends in the vehicle up-down direction from an end portion on the vehicle rear side of the impact absorption portion 16A. The crash boxes 16 are formed as a single integral unit from an extruded aluminum alloy material. The mounting portion of each crash box 16 is mounted on an end portion on the vehicle front side of the front side member, and is fixed thereto by means of mounting components such as bolts and the like. Note that the impact absorption portions 16A are disposed such that the axial direction thereof is along a straight line that runs from an inner side at the vehicle rear towards an outer side at the vehicle front. In other words, as viewed from the vehicle up-down direction, the pair of impact absorption portions 16A are arranged in a V-shape in which the V is open towards the vehicle front side.

The front bumper 18 is constructed so as to include a bumper cover 20, a [bumper reinforcement 22] (referred to below simply as a 'bumper RF 22'), a retainer 24, a [pedestrian collision detection sensor 26], and an [absorber 28].

The bumper cover 20 is formed from a plate material that is made from resin and extends in the vehicle transverse direction, and is disposed at a front end portion of the vehicle 10 so as to form part of a design surface on the vehicle front side of the vehicle 10. Note that the bumper cover 20 is fixed to the absorber 28 (described below) by means of a joining portion (not shown in the drawings) that employs an anchoring component or an adhesive agent or the like.

Figure 4:
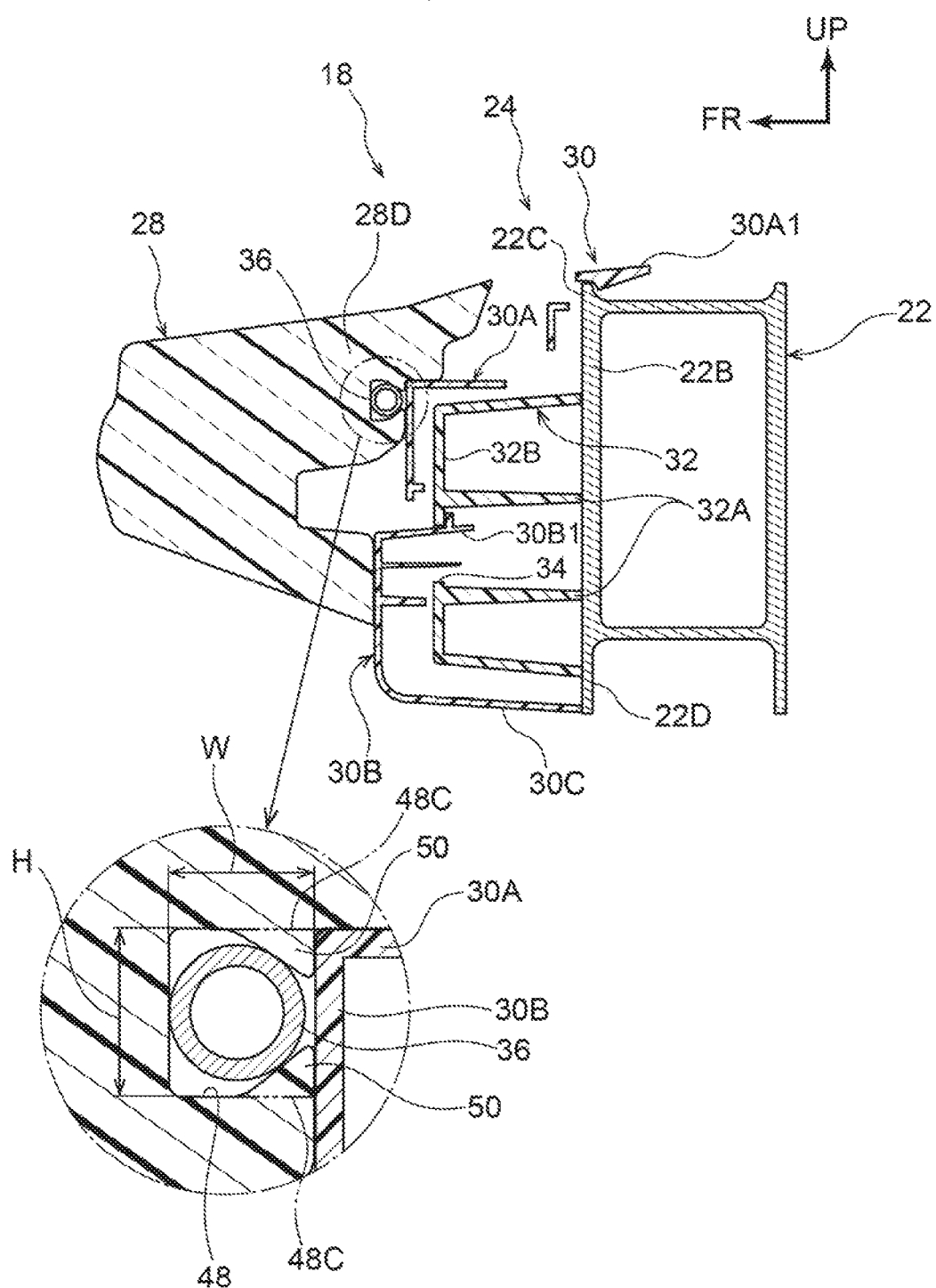
FIG. 4 is a cross-sectional view as seen from a vehicle transverse direction (i.e., an enlarged cross-sectional view showing a state along a cross-sectional line 4-4 in FIG. 5) showing the structure of the vehicle front portion structure that is provided with a pedestrian collision detection sensor according to the present exemplary embodiments.

The bumper RF 22 forms the framework of the front bumper 18, and extends between the two crash boxes 16 with the longitudinal direction of the bumper RF 22 aligned with the vehicle transverse direction. As is shown in FIG. 4, the bumper RF 22 is formed from an extruded aluminum alloy material having a rectangular frame-shaped closed cross-sectional structure when seen in a cross-sectional view taken in the longitudinal direction thereof. In addition, when seen in plan view, the bumper RF 22 is curved such that a central portion in the vehicle transverse direction thereof protrudes towards the vehicle front side. [End portions 22A] in the vehicle transverse direction of the bumper RF 22 are fixed to an end portion 16B on the vehicle front side of the crash boxes 16, by being mounted thereon by means of a joining portion (not shown in the drawings) that employs a mounting component such as a bolt or by welding or the like.

The retainer 24 is made from resin, and is disposed at the vehicle front side of the bumper RF 22 such that the longitudinal direction thereof extends in the vehicle transverse direction. This retainer 24 is constructed so as to include first retainer 30, which forms a principal portion of the retainer 24, a second retainer 32 that forms a central portion in the longitudinal direction of the retainer 24. More specifically, the first retainer 30 is formed in a bow shape in which a central portion in the vehicle transverse direction protrudes towards the vehicle front side as viewed from the vehicle up-down direction. As is shown in FIG. 4, the first retainer 30 is also formed so as to include an upper wall portion 30A that forms the vehicle upper side thereof, a front wall portion 30B that forms the vehicle front side thereof, and a lower wall portion 30C that forms the vehicle lower side thereof.

The upper wall portion 30A and the lower wall portion 30C are constructed in a trapezoidal plate shape whose width becomes wider as it moves from the vehicle front side towards the vehicle rear side as viewed from the vehicle up-down direction, and the plate thickness direction thereof extends in the vehicle up-down direction. Anchoring portions 30A1 are provided in plural locations in the longitudinal direction of the retainer 24 on a peripheral edge portion on the vehicle rear side of the upper wall portion 30A. A protruding portion 22C that is formed by a web portion 22B on the vehicle front side of the bumper RF 22 protruding upwards further towards the vehicle upper side is anchored by the anchoring portions 30A1. In contrast, anchoring portions 30C1 are also provided in plural locations in the longitudinal direction of the retainer 24 on a peripheral edge portion on the vehicle rear side of the lower wall portion 30C. A protruding portion 22D that is formed by a web portion 22B on the vehicle front side of the bumper RF 22 protruding downwards further towards the vehicle lower side is anchored by the anchoring portions 30C1. Namely, the retainer 24 is attached via the anchoring portions 30A1 and the anchoring portions 30C1 to the bumper RF 22. Note that, although a portion of the anchoring portions 30A1 and the anchoring portions 30C1 overlap each other as viewed from the vehicle up-down direction, fundamentally, they are disposed such that they alternate with each other in the longitudinal direction of the retainer 24.

The front wall portion 30B is constructed in a rectangular plate shape that extends in the vehicle transverse direction as viewed from the vehicle front-rear direction, and the plate thickness direction thereof extends in the vehicle front-rear direction. The front wall portion 30B is provided integrally with the upper wall portion 30A and the lower wall portion 30C. Portions of the front wall portion 30B that are located further to the outer side in the vehicle transverse direction than end portions on the outer side in the vehicle transverse direction of the upper wall portion 30A and the lower wall portion 30C form extended portions 24A that extend individually on the outer sides in the vehicle transverse direction of the retainer 24. In addition, rib portions (not shown in the drawings) that extend towards the vehicle rear side from the front wall portion 30B and are arranged in a lattice pattern as viewed from the vehicle front-rear direction are provided on a surface on the vehicle rear side of the front wall portion 30B. Note that plural engaged portions (not shown in the drawings) are provided on the front wall portion 30B and, as is described below, projecting portions 28A of the absorber 28 engage with the engaged portions.

As is also shown in FIG. 4, the second retainer 32 is constructed overall in a box shape whose longitudinal direction extends in the vehicle transverse direction, and whose vehicle rear side is left open. Rib portions 32A that are formed in a lattice shape as viewed from the vehicle front-rear direction are formed on the inside of the second retainer 32. The second retainer 32 is contained within a central portion in the vehicle transverse direction, which is the portion where no rib portions are provided out of the area partitioned by the upper wall portion 30A, the lower wall portion 30C, and the front wall portion 30B of the first retainer. A through hole portion 34 is formed in a central portion of a front wall portion 32B that forms the vehicle front side of the second retainer 32, and anchoring portions 30B1 that are provided on the front wall portion 30B of the first retainer 30 are anchored to a peripheral edge portion of the through hole portion 34.

The pedestrian collision detection sensor 26 is constructed so as to include a [pressure tube 36], and a pair of left and right pressure sensors 38 (broadly speaking, these are essential components that are regarded as pressure detectors) that detect that the pressure tube 36 has been pressed and output a signal.

Figure 3:
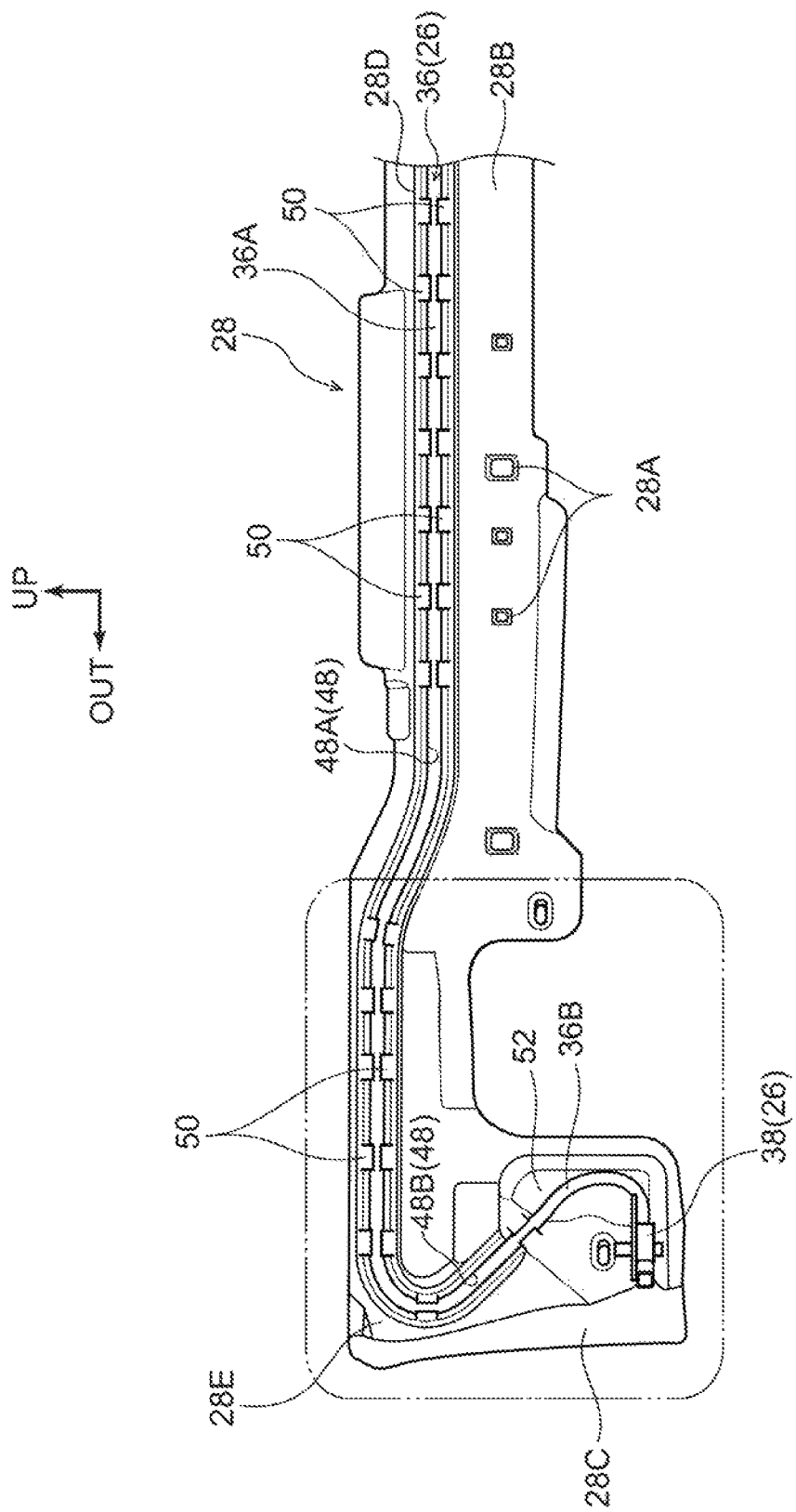
FIG. 3 is a front view as seen from a vehicle rear side showing a structure of an absorber that forms part of the vehicle front portion structure that is provided with a pedestrian collision detection sensor according to the present exemplary embodiments.

The pressure tube 36 is formed from an elastically deformable resin material and, more specifically, by a silicon tube or the like. As is shown in FIG. 3 and FIG. 4, a cross-section of the pressure tube 36 taken in a direction that is orthogonal to the longitudinal direction thereof is in the form of a toroidal, hollow structural body. Note that the cross-sectional configuration of the cross-section of the pressure tube 36 taken in a direction that is orthogonal to the longitudinal direction thereof is the same over the entire longitudinal direction of the pressure tube 36.

The pressure tube 36 is formed so as to include a [main tube 36A] that forms a principal portion thereof, and a pair of [outer side tubes 36B] that are provided continuously with the main tube 36A, and that form portions on the outer side in the vehicle transverse direction of the pressure tube 36. More specifically, the main tube 36A is disposed so as to be adjacent to the retainer 24 at the surface on the vehicle front side of the peripheral edge portion on the vehicle upper side of the front wall portion 30B of the retainer 24, and the main tube 36A also extends along this peripheral edge portion. In other words, as viewed from the vehicle front-rear direction, the main tube 36A is disposed along the bumper RF 22 so as to extend from the end portion 22A on one side in the longitudinal direction of the bumper RF 22 to the end, portion 22A on the other side in said longitudinal direction. The main tube 36A is held in a holding groove portion 48 that is provided in the absorber 28 as is described below.

In contrast, as viewed from the vehicle front-rear direction, the outer tubes 36B extend respectively towards the vehicle lower side from the positions on the main tube 36A of the end portions 22A of the bumper RF 22. More specifically, as is shown in FIG. 3, the outer side tube 36B that is located on the left side in the vehicle transverse direction is bent in an S-shape as viewed from the vehicle rear side. In other words, as viewed from the vehicle front-rear direction, the outer side tube is bent so as to protrude outwards in the vehicle transverse direction, and after extending downwards towards the center of the vehicle for a predetermined length, is bent again so as to protrude inwards in the vehicle transverse direction. As is shown in FIG. 1, the pressure sensor 38 is connected to an end portion 36B1 of the outer side tube 36B, namely, to an end portion of the pressure tube 36. Note that a portion on the vehicle upper side of a central portion in the vehicle up-down direction of the outer side tube 36B (hereinafter, this portion will be referred to as a [tube upper portion 36B2]) is held in the holding groove portion 48 that is provided in the absorber 28 in the same way as the main tube 36A.

Figure 2:
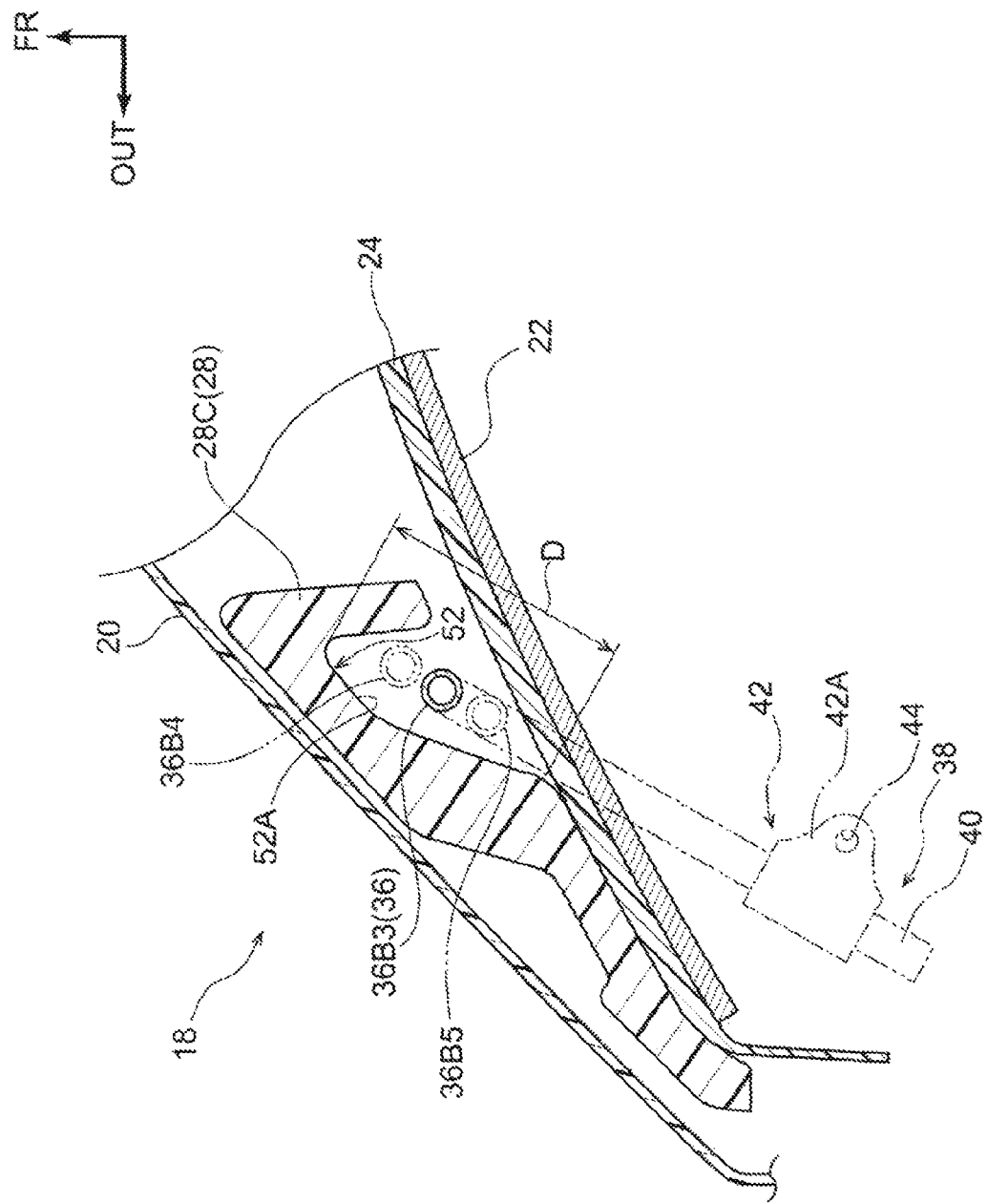
FIG. 2 is a cross-sectional view showing principal portions (i.e., an enlarged cross-sectional view showing a state along a cross-sectional line 2-2 in FIG. 1) of the vehicle front portion structure that is provided with a pedestrian collision detection sensor according to the present exemplary embodiments.

The pressure sensor 38 is constructed so as to include a connector portion 40 that is used to connect to wiring on the vehicle body 14 side, and a case portion 42 that houses a diaphragm and the like. As is also shown in FIG. 2, a plate-shaped mounting portion 42A that extends inwards in the vehicle transverse direction, and a circular cylinder-shaped positioning portion 42B that extends in the vehicle up-down direction are provided in the case portion 42. The mounting portion 42A is abutted against the lower surface of the lower wall portion 30C of the retainer 24 and, in this state, a bolt (i.e., a fastening component—not shown in the drawings) is inserted through an insertion portion 44 that is provided in the mounting portion 42A, and a nut is then screwed onto this bolt. As a result, the pressure sensor 38 is mounted on the lower wall portion 30C. In contrast, the positioning portion 42B is inserted through an insertion portion or the like (not shown in the drawings) that is provided in the lower wall portion 30C of the retainer 24 so that any rotation of the pressure sensor 38 around an axis in the vehicle up-down direction is suppressed. Note that, when mounted, the pressure sensor 38 is disposed such that, as viewed from the vehicle up-down direction, an axial direction of the connector portion 40 is along a straight line that runs from the inner side on the vehicle forward side to the outer side on the vehicle rearward side. In addition, an axial direction of a connection portion where the outer side tube 36B that is connected to the pressure sensor 38 makes the connection with the pressure sensor 38 is the same direction as the axial direction of the connector portion 40.

The pressure sensor 38 is electrically connected to an ECU 46 (broadly speaking, this is an essential component that can be considered to be a [collision determination portion]), and outputs signals to the ECU 46 based on pressure changes in the pressure tube 36. Specifically, the pressure sensor 38 is constructed such that it detects that the pressure tube 36 has been pressed (i.e., it detects deformations in the pressure tube 36) based on pressure changes inside the pressure tube 36, and outputs a signal to the ECU 46.

A speed sensor (not shown in the drawings) is electrically connected to the ECU 46, and it is possible for the speed of the vehicle 10 to be calculated in the ECU 46. Moreover, in the present exemplary embodiment a structure is employed in which, as an example, when the vehicle 10 is traveling at a predetermined speed or greater, if any pressing (i.e., deformation) of the pressure tube 36 is detected, then a pop-up device (not shown in the drawings) is operated, and a hood (not shown in the drawings) is popped up.

Note that it is also possible for a structure such as that described below to be employed in the pedestrian collision detection sensor. Namely, it is also possible to employ a structure in which, when the pressure tube 36 is deformed, the pressure sensor 38 outputs a signal to the ECU 46 that corresponds to the pressure changes inside the pressure tube 36. Moreover, a structure may be employed in which a collision speed sensor (not shown in the drawings) is electrically connected to the ECU 46, and a signal that corresponds to the speed of a collision with a collision object is output to the ECU 46 from this collision speed sensor. According to this type of structure, the ECU 46 calculates a collision load based on output signals from the pressure sensor 38, and is able to calculate the collision speed based on the output signals from the collision speed sensor. As a result, in the ECU 46, the effective mass of the collision object is determined from the calculated collision load and collision speed, and a determination is also made as to whether or not this effective mass exceeds a threshold value. It is thereby possible to determine whether the collision object is a pedestrian or whether it is an object other than a pedestrian (for example, a road obstacle such as a post cone or the like).

Here, the characteristic feature of the present exemplary embodiment lies in the structure of the absorber 28 that is disposed between the bumper cover 20 and the retainer 24. Hereinafter, the structure of the absorber 28 that forms a principal portion of the present exemplary embodiment will be described in detail.

Figure 5:
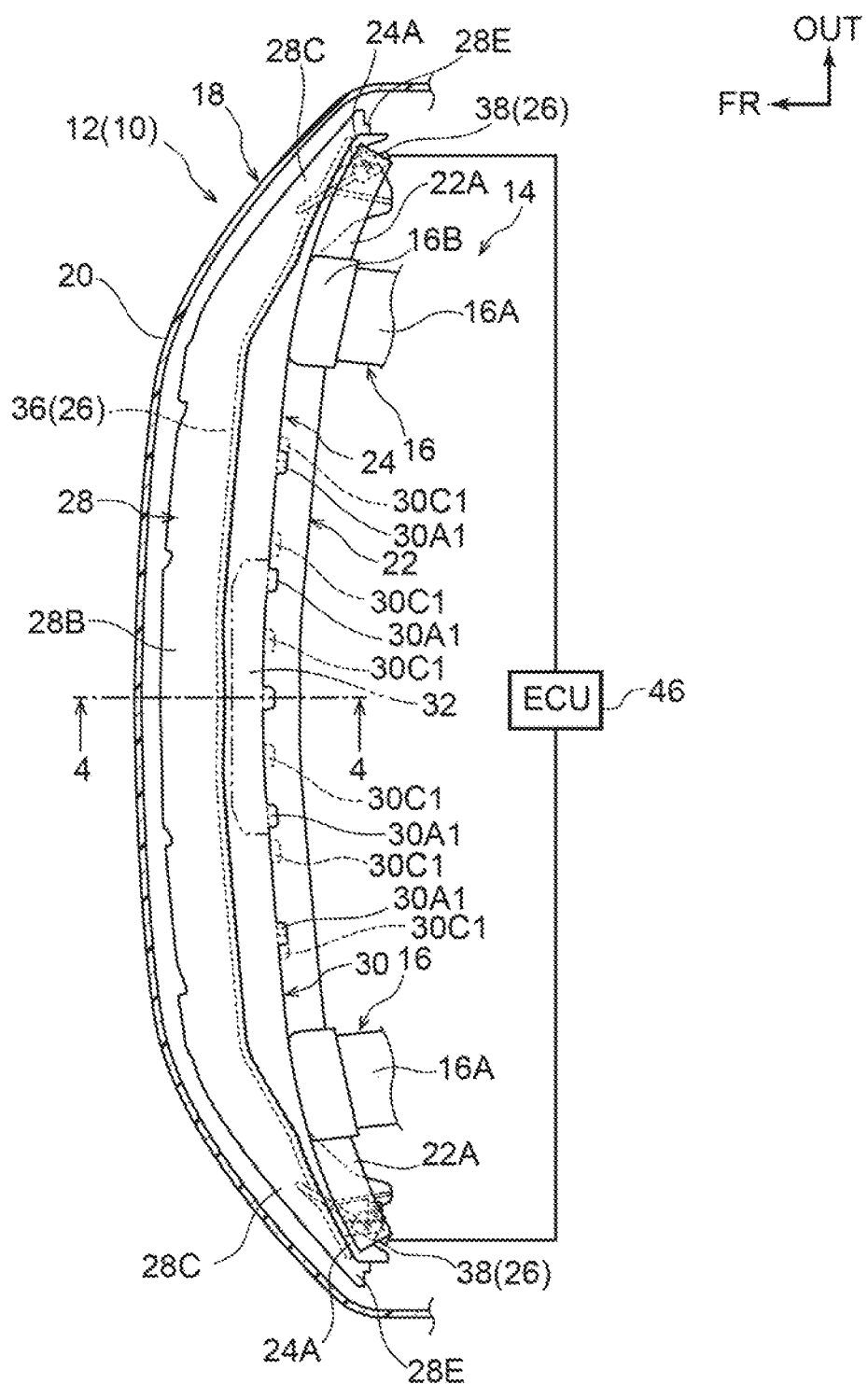
FIG. 5 is a plan view as seen from a vehicle upper side showing the structure of the vehicle front portion structure that is provided with a pedestrian collision detection sensor according to the present exemplary embodiments.

As is shown in FIG. 5, the absorber 28 is disposed on the vehicle rear side of the bumper cover 20 and on the vehicle front side of the retainer 24, and is aligned such that the longitudinal direction thereof extends in the vehicle transverse direction. The absorber 28 is constructed in a bow shape in which a central portion in the vehicle transverse direction protrudes towards the vehicle from side as viewed from the vehicle up-down direction. This absorber 28 is formed from a foamed resin material such as urethane foam or the like. As is shown in FIG. 3, the shape of the absorber 28 as viewed from the vehicle front-rear direction is formed in an M-shape, and the absorber 28 covers the pressure tube 36, the retainer 24, and consequently the bumper RF 22 from the vehicle front side.

More specifically, the absorber 28 is constructed so as to include a base portion 28B that forms a principal portion of the absorber 28, and a pair of side portions 28C that are provided at outer sides in the vehicle transverse direction of the base portion 28B. The base portion 28B is formed in a rectangular shape whose longitudinal direction extends in the vehicle transverse direction as viewed from the vehicle front-rear direction and, as is shown in FIG. 4, the cross-sectional configuration thereof as viewed from the vehicle transverse direction is formed in a trapezoidal shape that becomes gradually wider as it moves from the vehicle front side towards the vehicle rear side. Square column-shaped projecting portions 28A that protrude on the vehicle rear side at plural locations in the longitudinal direction of the absorber 28 are provided on a surface on the vehicle rear side of the base portion 28B. The absorber 28 is positioned relative to the retainer 24 as a result of these projecting portions 28A being engaged with corresponding engagement portions of the retainer 24, and the absorber 28 is fixed to the retainer 24 as a result of anchoring portions (not shown in the drawings) provided on the retainer 24 being anchored to the absorber 28.

In contrast, the shape of the side portions 28C as viewed from the vehicle front-rear direction is a rectangular shape whose longitudinal direction extends in the vehicle up-down direction. The shape of the side portions 28C as viewed from the vehicle up-down direction is a triangular shape whose width becomes gradually smaller as it moves from the inner side in the vehicle transverse direction towards the outer side in the vehicle transverse direction.

The holding groove portion 48 that holds the pressure tube 36 is provided in the absorber 28, and this holding groove portion 48 is constructed so as to include a horizontal groove portion 48A that forms the principal part thereof, and a pair of inclined groove portions 48B that are provided on the outer sides in the vehicle transverse direction of the horizontal groove portion 48A. More specifically, the horizontal groove portion 48A is formed in a surface on the vehicle rear side of a peripheral edge portion 28D on the vehicle upper side of the absorber 28, such that it extends from an end portion 28E on one side in the longitudinal direction of the absorber 28 to an end portion 28E on another side in the longitudinal direction of the absorber 28. In contrast, the inclined groove portions 48B are formed such that they continue on from the outer sides in the vehicle transverse direction of the horizontal groove portion 48A, and are shaped such that, as viewed from the vehicle front-rear direction, they are bent such that they protrude towards the outer side in the vehicle transverse direction from the horizontal groove portion 48A, and then extend inwards and towards the vehicle lower side for a predetermined length. The main tube 36A of the pressure tube 36 and the tube upper portion 36B2 of the outer side tube 36B are inserted in the holding groove portion 48. Note that, as is shown in FIG. 4, the cross-sectional configuration of the holding groove portion 48 taken in a direction that is orthogonal to the longitudinal direction thereof is formed in a rectangular shape that is open towards the vehicle rear side, and a width H thereof in the vehicle up-down direction and a width W thereof in the vehicle front-rear direction are set to dimensions that prevent the pressure tube 36 from being pressed excessively against the wall portions of the holding groove portion 48.

Anchoring portions 50 are provided integrally with the absorber 28 in plural locations on peripheral edge portions 48C of the holding groove portion 48. These anchoring portions 50 are disposed at predetermined intervals in the longitudinal direction of the holding groove portion 48, and are provided in pairs in a direction that is orthogonal to this longitudinal direction. More specifically, as is shown in FIG. 1 and FIG. 4, the anchoring portions 50 are formed in a rectangular shape along the longitudinal direction of the holding groove portion 48 as viewed from the vehicle front-rear direction and, as viewed from this longitudinal direction, are formed in the shape of a right-angled triangle that becomes wider as it moves from the vehicle front side towards the vehicle rear side. Note that in the enlarged view (i.e., the portion surrounded by the single-dot chain line) of the cross-section of the holding groove portion 48 that is shown in FIG. 4, a portion of the cross-section of the holding groove portion 48 in a state in which the anchoring portions 50 are not provided is shown by a single-dot chain line. By providing the anchoring portions 50 in the manner described above, while displacement in the longitudinal direction of the holding groove portion 48 by the main tube 36A of the pressure tube 36 and the tube upper portion 36B2 of the outer side tubes 36B is permitted, any displacement thereof in the vehicle front-rear direction is restricted. In addition, a [recessed portion 52] that is provided continuously with the holding groove portion 48 is provided in the side portions 28C of the absorber 28.

As is shown in FIG. 1, the recessed portions 52 are formed in a rectangular shape as viewed from the vehicle front-rear direction in a portion on the inner side in the vehicle transverse direction of a portion on the vehicle lower side of the side portions 28C of the absorber 28. More specifically, as viewed from the vehicle front-rear direction, each recessed portion 52 is disposed such that a predetermined range of the side portion 28C that overlaps with a portion that is further to the vehicle lower side than a central portion in the vehicle up-down direction of the outer side tube 36B (referred to below as a [tube lower portion 36B3]) is contained on the inner side of the recessed portion 52. Here, this predetermined range will be described. When the peripheral temperature surrounding the pressure tube 36 rises, the overall length of the pressure tube 36 increases, and when it reaches its assumed maximum length, the external configuration of the tube lower portion 36B3 changes to the shape of the tube lower portion 36B4, which is shown by a double-dot chain line in FIG. 1. In contrast, when the peripheral temperature surrounding the pressure tube 36 falls, the overall length of the pressure tube 36 decreases, and when it reaches its assumed minimum length, the external configuration of the tube lower portion 36B3 changes to the shape of the tube lower portion 36B5, which is shown by a double-dot chain line in FIG. 1. Namely, as viewed from the vehicle front-rear direction, the predetermined range is a range that includes not only the portions of the absorber 28 that overlap with the tube lower portion 36B3 when this is mounted, but also portions that overlap with the tube lower portion 36B3 when this is expanded or contracted by changes in temperature (i.e. portions that overlap with an area enclosed by the tube lower portion 36B4 and the tube lower portion 36B5).

As is shown in FIG. 2, as viewed from the vehicle up-down direction, the recessed portion 52 increases in width as it moves from the outer side in the vehicle transverse direction towards the inner side in the vehicle transverse direction, and is formed in a triangular or trapezoidal shape that is open towards the vehicle rear side. Namely, the recessed portion 52 is recessed towards the vehicle front side from a surface on the vehicle rear side of the side portion 28C. Furthermore, a depth D of the recessed portion 52 in the axial direction of the connector 40 of the pressure sensor 38 is set to a large enough dimension that it is able to house the tube lower portions 36B4 and 36B5. Note that the tube lower portions 36B3, 36B4, and 36B5 are all separated in the vehicle front-rear direction from a bottom surface portion 52A of the recessed portion 52. In other words, the predetermined range of the absorber 28 is separated in the vehicle front-rear direction from the tube lower portions 36B3, 36B4, and 36B5.

(Action and Effects of the Present Exemplary Embodiment)

Next, the action and effects of the present exemplary embodiment will be described.

As is shown in FIG. 5, in the present exemplary embodiment, the pressure tube 36 which forms part of the pedestrian collision detection sensor 26 is disposed on a vehicle front side of the bumper RF 22 which is disposed such that its longitudinal direction is aligned in the vehicle transverse direction. As is shown in FIG. 1, the pressure tube 36 is provided with the main tube 36A and the pair of outer side tubes 36B. The main tube 36A is disposed along the bumper RF 22 from the end portion 22A on the one side in the longitudinal direction of the bumper RF 22 to the end portion 22A on the other side in this longitudinal direction. In contrast, the outer side tubes 36B are provided continuously with the main tube 36A and, as viewed from the vehicle front-rear direction, extend respectively from the positions on the main tube 36A of the end portion 22A located on the one side in the longitudinal direction of the bumper RF 22 and the end portion 22A located on the other side in this longitudinal direction. The absorber 28 is disposed on the vehicle front side of the bumper RF 22 such that the longitudinal direction thereof is aligned with the vehicle transverse direction, and the vehicle front sides of the bumper RF 22 and the pressure tube 36 are covered by this absorber 28. Moreover, the holding groove portion 48 is provided in the absorber 28, and the main tube 36A and the tube upper portions 36B2 of the outer side tubes 36B are held by the holding groove portion 48.

Because of this, during a collision between a collision object such as a pedestrian or the like and the vehicle 10, if the collision load from this collision object is input into the absorber 28, the main tube 36A or the tube upper portion 36B2 are pressed by the absorber 28. At this time, the vehicle rear side of the main tube 36A and the tube upper portion 36B2 are supported by the bumper RF 22. As a result, the pressure tube 36 receives reaction force from the bumper RF 22 and is deformed. Based on the pressure changes in the pressure tube 36, a signal is output from the pedestrian collision detection sensor 26 to the ECU 46.

A possibility may also be considered in which, if a collision object such as a small animal collides with a vehicle, then when the absorber 28 comes into contact with the tube lower portion 36B3 of the outer side tube 36B, the tube lower portion 36B3 is pressed by the absorber 28 and a signal is output from the pedestrian collision detection sensor 26 to the ECU 46.

Here, in the present exemplary embodiment, the predetermined range of the absorber 28 that overlaps with the whet lower portion 36B3 as viewed from the vehicle front-rear direction is separated in the vehicle front-rear direction from the tube lower portion 36B3. Because of this, between the predetermined range of the absorber 28 and the tube lower portion 36B3, the free running distance from the predetermined range of the absorber 28 to the tube lower portion 36B3 is secured. As a result, even if a collision object such as a small animal or the like collides with the vehicle 10, it is possible to suppress any pressing of the tube lower portion 36B3 by the absorber 28. Accordingly, in the present exemplary embodiment, in cases in which the collision object is a small animal or the like, it is possible to suppress any effect imparted to the pressure tube 36 by the collision object.

In the present exemplary embodiment, the recessed portion 52 that is recessed towards the vehicle front side is formed within the predetermined range of the absorber 28 that overlaps with the tuber lower portion 36B3 as viewed from the vehicle front-rear direction. Because of this, even if a collision object such as a small animal collides with the vehicle 10 and causes the absorber 28 to be displaced towards the vehicle rear side thereof, the tube lower portion 36B3 is contained within the recessed portion 52, and any contact between the tube lower portion 36B3 and the absorber 28 is suppressed. Accordingly, in the present exemplary embodiment, any effect imparted to the pressure tube 36 by the collision object is suppressed without the shape of the absorber 28 being altered in any major way, and a degree of freedom when designing the bumper cover 20 that is disposed on the vehicle front side of the absorber 28 can be secured.

Furthermore, in the present exemplary embodiment, the pressure tube 36 is constructed from an elastically deformable resin material, and the pressure tube 36 can be easily disposed in the holding groove portion 48 of the absorber 28.

A possibility may also be considered in which, when the peripheral temperature surrounding the pressure tube 36 changes, this may affect the pressure tube 36 and cause it to expand or contract, which may cause the hold on of the pressure tube 36 by the holding groove portion 48 to be released.

For this reason, in the present exemplary embodiment, the anchoring portions 50 that restrict displacement of the pressure tube 36 in the vehicle front-rear direction are formed in plural locations on the peripheral edge portions 48C of the holding groove portion 48 so that, even if the pressure tube 36 does expand or contract, the pressure tube 36 remains in a state of being held by the holding groove portion 48.

However, because it is difficult to prevent the pressure tube 36 from expanding or contracting when this is caused by changes in the peripheral temperature surrounding the pressure tube 36, the possibility that the length of the pressure tube 36 will change due to such changes in the peripheral temperature surrounding the pressure tube 36 must be considered.

Here, in the present exemplary embodiment, because any displacement of the main tube 36A and the tube lower portion 36B3 of the pressure tube 36 in any direction other than the longitudinal direction thereof is suppressed by the holding groove portion 48 and the anchoring portions 50, any change in the length of the pressure tube 36 is concentrated in the tube lower portion 36B3. Specifically, as is shown in FIG. 1, when the peripheral temperature surrounding the pressure tube 36 increases, the overall length of the pressure tube 36 also increases. As a result, the tube lower portion 36B3 moves to a position closer to the inner side in the vehicle transverse direction than the position thereof when it was first mounted, as is shown by the tube lower portion 36B4. In contrast, when the peripheral temperature surrounding the pressure tube 36 decreases, the overall length of the pressure tube 36 also decreases. As a result, the tube lower portion 36B3 moves to a position closer to the outer side in the vehicle transverse direction than the position thereof when it was first mounted, as is shown by the tube lower portion 36B5.

In present exemplary embodiment, as is described above, the predetermined range of the absorber 28 is separated in the vehicle front-rear direction from the tube lower portion 36B3. Because of this, the amount of change in the length of the pressure tube 36 that is caused by changes in the peripheral temperature and the like surrounding the pressure tube 36 can be absorbed by the space between the absorber 28 and the tube lower portion 36B3. Accordingly, in the present exemplary embodiment, it is possible to suppress both the effects imparted to the pressure tube 36 by a collision object such as a small animal or the like, and the effects imparted to the pressure tube 36 by the peripheral temperature surrounding the pressure tube 36.

[Supplementary Description to the Above-Described Exemplary Embodiment]

(1) In the above-described exemplary embodiment, the retainer 24 is disposed between the absorber 28 and the bumper RF 22, however, it is also possible to employ a structure in which, depending on the structure of the bumper RF 22 and the absorber 28 and the like, no retainer 24 is provided.

(2) Moreover, in the above-described exemplary embodiment, the pressure sensor 38 is mounted on the retainer 24, however, it is also possible to employ a structure in which the pressure sensor 38 is suitably mounted on some other component. It is also possible for the shape of the recessed portion 52 to be suitably altered in accordance with the orientation of the connector portion 40 of the pressure sensor 38.

(3) Furthermore, in the above-described exemplary embodiment, the outer side tubes 36B of the pressure tube 36 are laid in an S-shape, however, the present invention is not limited to this. As an example, it is also possible to employ a structure in which the outer side tubes 36B are each laid so as to extend in a straight line on the vehicle lower side from the positions on the main tube 36A of the end portions 22A of the bumper RF 22. In this case, the recessed portion 52 may be formed in a circular column-shape that extends in the vehicle up-down direction and is open on the vehicle rear side.

(4) In addition, in the above-described exemplary embodiment, a structure is employed in which the recessed portion 52 is provided in the absorber 28 so that any transmission of a collision load from a collision object such as a small animal or the like to the pressure tube 36 is suppressed, however, the present invention is not limited to this. As an example, it is also possible to employ a structure in which there is no recessed portion 52 provided in the side portions 28C of the absorber 28, and the side portions 28C are separated in the vehicle front-rear direction from the tube lower portions 36B3 of the pressure tube 36 by altering the shape of the side portions 28C.

What is claimed is:

1. A vehicle front portion structure provided with a pedestrian collision detection sensor, the vehicle front portion structure comprising:
a bumper reinforcement disposed at a vehicle front end portion side such that a longitudinal direction of the bumper reinforcement is aligned with a vehicle transverse direction;
a pedestrian collision detection sensor comprising a pressure tube and a pressure sensor outputting signals based on pressure changes in the pressure tube, the pressure tube comprising: a main tube disposed at a vehicle front side of the bumper reinforcement and extending along the bumper reinforcement from one end portion in the longitudinal direction of the bumper reinforcement to another end portion in the longitudinal direction thereof; and a pair of outer side tubes provided continuously with the main tube and, as viewed from a vehicle front-rear direction, extending respectively towards a vehicle lower side from positions of the one end portion and the other end portion of the main tube; and
an absorber disposed at the vehicle front side of the bumper reinforcement such that a longitudinal direction of the absorber is aligned with the vehicle transverse direction, the absorber covering the bumper reinforcement and the pressure tube from the vehicle front side, and comprising a holding groove portion holding the main tube and portions of the outer side tubes at a vehicle upper side, and, in the absorber, a predetermined range overlapping with portions of the outer side tubes at the vehicle lower side as viewed from the vehicle front-rear direction is separated in the vehicle front-rear direction from the portions of the outer side tubes at the vehicle lower side.

2. The vehicle front portion structure provided with a pedestrian collision detection sensor according to claim 1, further comprising a recessed portion recessed towards the vehicle front side and formed within the predetermined range.

3. The vehicle front portion structure provided with a pedestrian collision detection sensor according to claim 1, further comprising anchoring portions formed at a plurality of locations at peripheral edge portions of the holding groove portion, the anchoring portions restricting any displacement of the pressure tube in the vehicle front-rear direction, and the pressure tube being constructed from an elastically deformable resin material.

4. The vehicle front portion structure provided with a pedestrian collision detection sensor according to claim 1, wherein the pressure sensor is surrounded with the absorber.

* * * * *